United States Patent
Owen et al.

(10) Patent No.: US 10,032,481 B2
(45) Date of Patent: Jul. 24, 2018

(54) SPEEDY CLIPPING

(71) Applicant: Verizon Patent and Licensing Inc., Basking Ridge, NJ (US)

(72) Inventors: Calvin Ryan Owen, Draper, UT (US); Tyler Willey, Saratoga Springs, UT (US); David Frederick Brueck, Saratoga Springs, UT (US)

(73) Assignee: Verizon Digital Media Services Inc., Dulles, VA (US)

( * ) Notice: Subject to any disclaimer, the term of this patent is extended or adjusted under 35 U.S.C. 154(b) by 323 days.

(21) Appl. No.: 15/077,795

(22) Filed: Mar. 22, 2016

(65) Prior Publication Data
US 2017/0278543 A1 Sep. 28, 2017

(51) Int. Cl.
| | |
|---|---|
| *H04N 5/765* | (2006.01) |
| *G11B 27/031* | (2006.01) |
| *H04N 19/114* | (2014.01) |
| *H04N 19/40* | (2014.01) |
| *H04N 19/172* | (2014.01) |
| *H04N 19/142* | (2014.01) |

(52) U.S. Cl.
CPC ......... *G11B 27/031* (2013.01); *H04N 19/114* (2014.11); *H04N 19/142* (2014.11); *H04N 19/172* (2014.11); *H04N 19/40* (2014.11)

(58) Field of Classification Search
CPC .. G11B 27/031; H04N 19/114; H04N 19/142; H04N 19/172; H04N 19/40
See application file for complete search history.

(56) References Cited

U.S. PATENT DOCUMENTS

| | | | |
|---|---|---|---|
| 2014/0133837 A1* | 5/2014 | Mate ..... | G11B 27/031 386/278 |
| 2016/0100173 A1* | 4/2016 | McBrearty ..... | H04N 19/40 375/240.24 |

\* cited by examiner

*Primary Examiner* — Thai Tran
*Assistant Examiner* — Jose Mesa
(74) *Attorney, Agent, or Firm* — Los Angeles Patent Group; Arman Katiraei (57) ABSTRACT

Provided is a system for efficiently creating snippets or clips from media assets without re-encoding the entire portion of already encoded media content falling within the snippet boundaries. The system partitions and encodes the original media asset as set of slices with each slice encoding a different temporal chunk of the media asset. The system identifies a first slice that encodes a duration of the media asset spanning the snippet start time, and a second slice that encodes a duration of the media asset spanning the snippet end time. The system produces a snippet start slice from decoding, clipping, and re-encoding the first slice and a snippet end slice from decoding, clipping, and re-encoding the second slice. The system generates the snippet from the snippet start slice, an unmodified subset of the set of slices between the first slice and the second slice, and the snippet end slice.

20 Claims, 6 Drawing Sheets

SPEEDY CLIPPING

BACKGROUND ART

Content distribution, especially video distribution, is continuing to move away from traditional broadcast mediums to online and over-the-top distribution. New tools are needed to aid in this transition. With respect to video, new tools are needed to efficiently create the content, bring the content online, and distribute the content. Accordingly, there is a need for better video editing, manipulation, encoding, transcoding, and distribution tools.

Clipping is the process of cropping or selecting one or more portions of a video asset or streaming asset and preserving the one or more portions as new video asset. The video assets that are generated from different portions of existing video assets are referred to as snippets.

A snippet can be used to present or promote existing video content through alternative formats. For instance, a snippet from a broadcast news report can be used to enhance an online text based article relating to the same report. A snippet can also be used as a trailer, advertisement, or teaser for promotional purposes.

Traditional snippet generation involves an editor identifying a start marker and an end marker somewhere within an original video asset. A clipping tool then re-encodes the portion of the original asset falling within the start marker and end marker clip boundaries in order to produce the snippet from the original asset.

Clipping in this manner is inefficient for several reasons. Re-encoding the portion is expensive in terms of time and computer resources. The longer the snippet, the longer the re-encoding time. Moreover, these resources are expended in performing a redundant operation, namely encoding a portion of video from an already encoded original asset in order to simply extract and reproduce the portion of video as a separate and independent asset from the original asset. This redundant encoding also results in reduced quality as encoding is a lossy process. A snippet that is produced from encoding an already encoded asset will suffer some quality loss and a subsequent snippet encoded therefrom suffers even greater quality loss.

Accordingly, there is a need for improved video clipping and snippet generation. In particular, there is a need to efficiently generate a snippet from an existing video asset, wherein the efficient generation reduces or eliminates the time and computer resources expended to re-encode the video portion of the snippet, and further reduces or eliminates the quality loss resulting from the re-encoding.

BRIEF DESCRIPTION OF THE DRAWINGS

A preferred embodiment of methods and systems for speedy clipping will now be described, by way of example only, with reference to the accompanying drawings in which.

DETAILED DESCRIPTION

Provided is a video generation system for efficiently creating snippets from existing video assets without re-encoding the entire portion of already encoded video falling within the snippet boundaries. The video generation system creates a snippet by re-encoding very short durations of the original video asset at the beginning and end of the snippet, and by reusing already encoded portions of the original asset falling in between. In doing so, the video generation system presented herein is able to create snippets faster and with little or no quality loss relative to prior art systems and methods for snippet generation.

Figure 1:
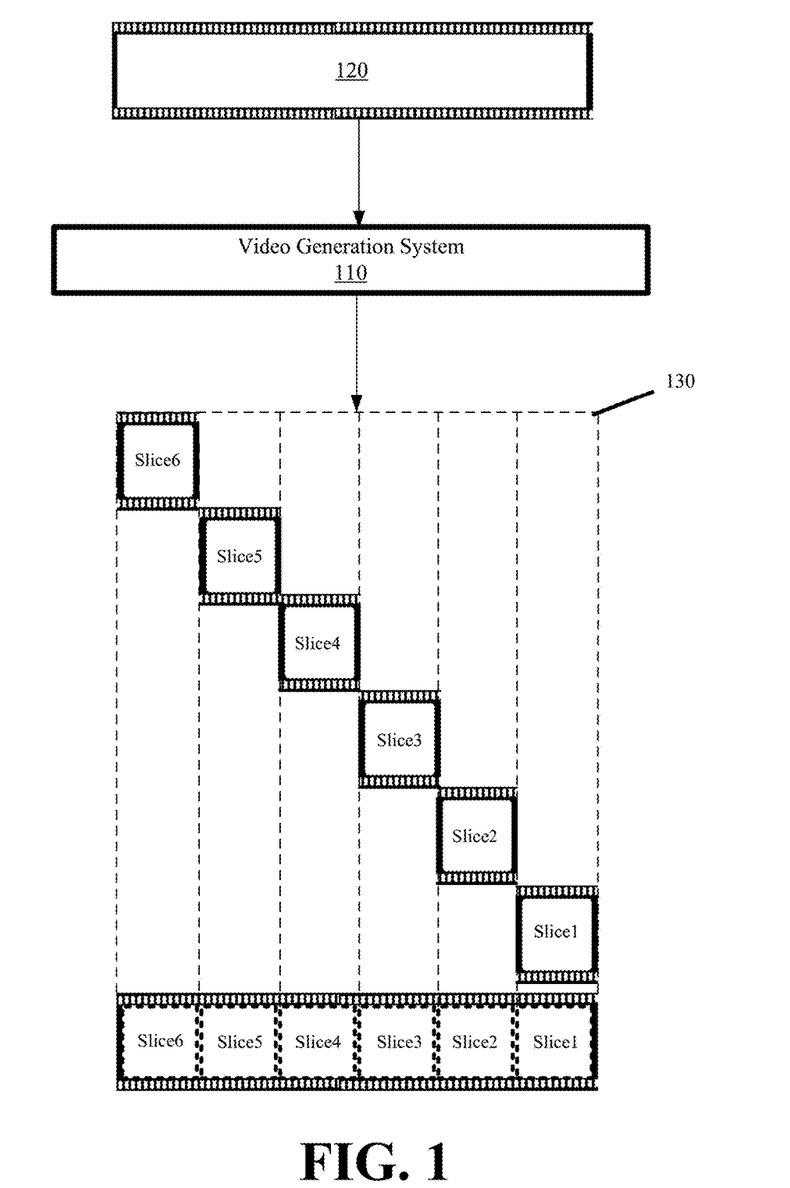
FIG. 1 conceptually illustrates the video generation system creating a sliced encoding of an original video asset from which snippets can be efficiently generated in accordance with some embodiments.

In some embodiments, snippet generation is predicated on a sliced encoding of an original video asset. FIG. 1 conceptually illustrates the video generation system creating a sliced encoding of an original video asset from which snippets can be efficiently generated in accordance with some embodiments. FIG. 1 illustrates the video generation system 110, an original video asset 120, and a resulting sliced encoding 130 of the original video stream produced by the video generation system.

The original video asset 120 can originate from a source feed (i.e., a digital video camera), a broadcast signal, a stream, or a media file. The original video asset 120 can include a combination of audio and video or just video. It should be noted that the video generation system and described embodiments can also be applied to create audio only snippets from an original audio asset. Accordingly, the embodiments are applicable to a variety of media files or media content.

The video generation system 110 partitions the original video asset 120 into a sequence of slices. The slices can then be distributed across one or more encoders of the video generation system 110 for encoding. Each resulting encoded slice 130 represents a different temporal chunk that encodes a short but different duration or portion of the original video asset 120. Each encoded slice is therefore defined by a set of video frames.

Per industry practice, the frames are a combination of key frames or I-frames, P-frames, and B-frames. I-frames are decoded based on information solely contained within the I-frame. An image or individual video frame can therefore be rendered based on information from a single I-frame. P-frames are decoded with reliance on data from one or more previous frames. B-frames are decoded with reliance on data from one or more previous and forward frames. In particular, P-frames and B-frames reference other frames for changes in image data or vector displacement so that different images can be rendered from the P and B frames without duplicating information from the other referenced frames. It should be noted that the embodiments and slices can be adapted to include other types of frames in addition to or in place of the I, P, and B frames. The efficient clipping can be performed on any such frame type.

In some embodiments, each encoded slice commences with an I-frame. Subsequent frames for the remaining duration of each encoded slice can contain a mix of I, P, B, and other frames. The frame mix is produced by the encoder based on encoding settings that were specified for the video asset, wherein the encoding settings can include bit rates, quality settings, compression settings, resolution, etc. Further detail regarding the slicing of a video asset and the encoding of the slices can be found in U.S. patent application Ser. No. 13/448,213 entitled "Decoupled Slicing and Encoding of Media Content". The contents of application Ser. No. 13/448,213 are incorporated herein by reference.

Figure 2:
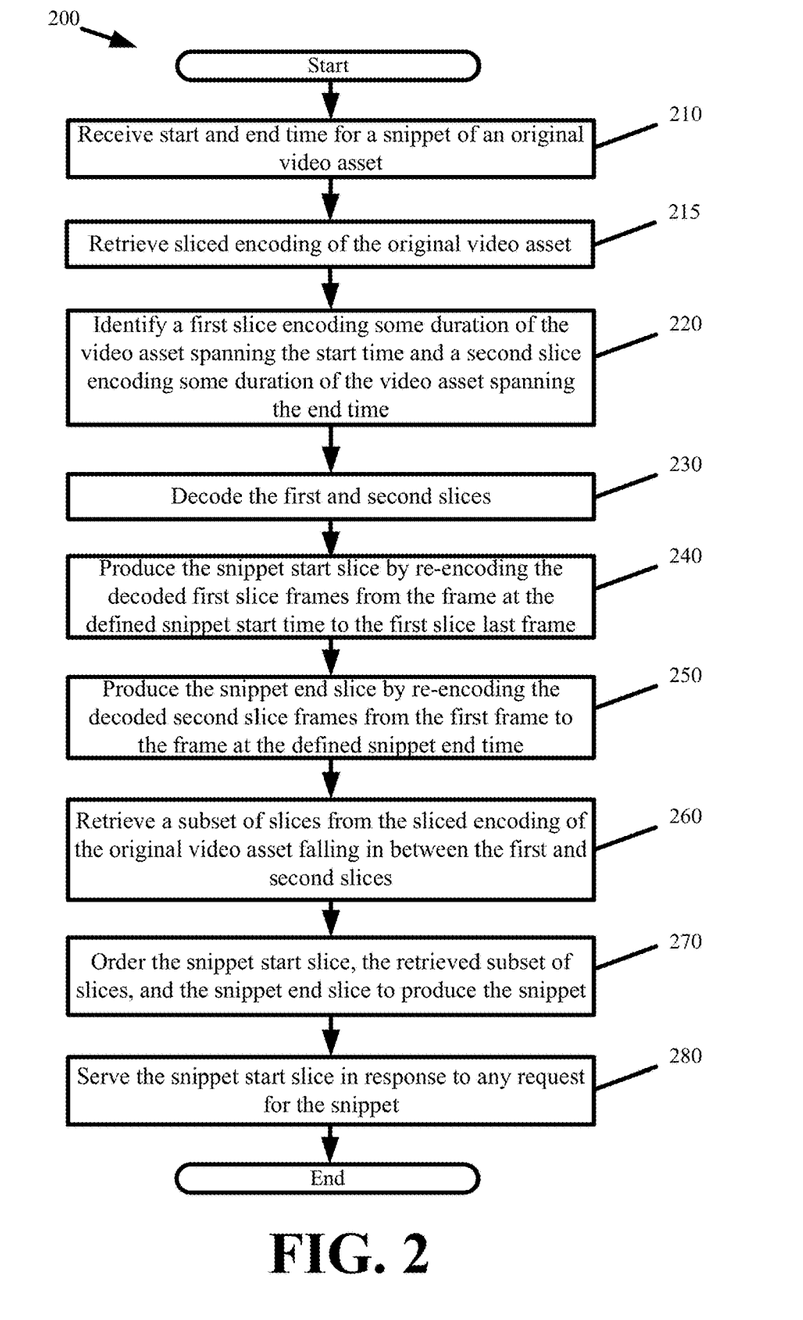
FIG. 2 presents a process for creating a snippet from the sliced encoding of an original video asset in accordance with some embodiments.

The encoded slices 130 provide the foundation for efficient clipping and snippet generation. FIG. 2 presents a process 200 for creating a snippet from the sliced encoding of an original video asset in accordance with some embodiments. The process 200 is performed by the video generation system on a sliced encoding of the original video asset.

The process 200 commences by receiving (at 210) user defined start and end times for a snippet of an original video asset. In response, the process retrieves (at 215) the sliced encoding of the original video asset. In other words, the video generation system retrieves the encoded slices that were produced from encoding the original video asset.

The process identifies (at 220) a first slice and a second slice from the plurality of slices of the sliced encoding of the original video asset based on the user defined snippet start and end times. The first slice identified at 220 is a slice from the plurality of slices that encodes a duration of the video asset spanning the user defined snippet start time. The first slice identified at 220 may therefore not correspond to the initial slice that encodes the first seconds of the original video asset. The second slice identified at 220 is a different slice from the plurality of slices that encodes a duration of the video asset spanning the snippet end time.

The first and second slices cannot be arbitrarily clipped to the defined snippet start and end times, because the snippet start and end times may point to P or B frames from the first and second slices that reference data from other frames in those slices. Accordingly, the process decodes (at 230) the first and second slices. From the decoding, the video generation system obtains frame information for all frames in the slices. The decoding essentially converts each frame in the first and second slices into I-frames. In some embodiments, the decoding also associates a timestamp or duration to each frame.

The process produces (at 240) the snippet start slice by re-encoding the decoded first slice frames from the frame at the defined snippet start time to the first slice last frame. The re-encoding clips the first slice by excluding any frames that are before the defined snippet start time. In producing the snippet start slice, the specific frame at the snippet start time is encoded as an I-frame and subsequent frames from the original asset first slice are encoded as a combination of I, P, B, and other frame types depending on encoder settings. Consequently, the resulting snippet start slice commences with the specific frame at the snippet start time.

The process produces (at 250) the snippet end slice by re-encoding the decoded second slice frames from the first frame to the frame at the defined snippet end time. Here again, the re-encoding clips the second slice such that the resulting snippet end slice ends with the specific frame at the snippet end time.

The process retrieves (at 260) a subset of slices from the sliced encoding of the original video asset falling in between the first and second slices or the snippet start and end slices. More specifically, the subset of slices encode a duration of the video asset that is in between the snippet start and end slices and not already encoded within the snippet start and end slices. Unlike the first and second slices of the original video asset, the subset of slices in between the first and second slices are not decoded or re-encoded. The retrieval at 260 involves obtaining the original encoding for subsequent reuse in creating the snippet.

The process (at 270) orders the snippet start slice, the retrieved subset of slices from the encoding of the original video asset, and the snippet end slice to produce the snippet. In some embodiments, the ordering involves creating a manifest file listing the slices and other information (e.g., slice duration, encoded bit rate, etc.) for snippet playback. The manifest file provides client players with the slice ordering, thereby allowing the players to request the proper slice sequence for snippet playback. The ordering may further include storing the snippet start and end slices along with the retrieved subset of slices for subsequent distribution. In some embodiments, the video generation system merges the snippet start slice, the retrieved subset of slices, and the snippet end slice as a new video or snippet asset that exists independent of the original video asset. The merging can involve combining the snippet slices into a single file for subsequent distribution.

Thereafter, the process serves (at 280) the snippet start slice in response to any request for the snippet. The process will continue to serve the remaining snippet slices until the snippet end slice or until playback is terminated.

The video generation system produces the snippet, and in particular, the snippet start slice and the snippet end slice with insignificant time and computer resource usage as each of the slices spans no more than a few seconds of video. Accordingly, producing the snippet start slice and snippet end slice involves re-encoding those few seconds of video, rather than the entire snippet, regardless of the total length of the snippet. There is therefore little to no difference in creating a snippet that is ten seconds in duration from one that is ten minutes in duration.

Moreover, the video generation system largely preserves the quality of the snippet relative to the original video asset encoding from which the snippet is produced. The video generation system loses quality in just the snippet start and end slices as a result of re-encoding these slices. There is however no quality lost in all other slices between the snippet start slice and the snippet end slice as these other slices are reused without any modification from the original video asset encoding.

Figure 3:
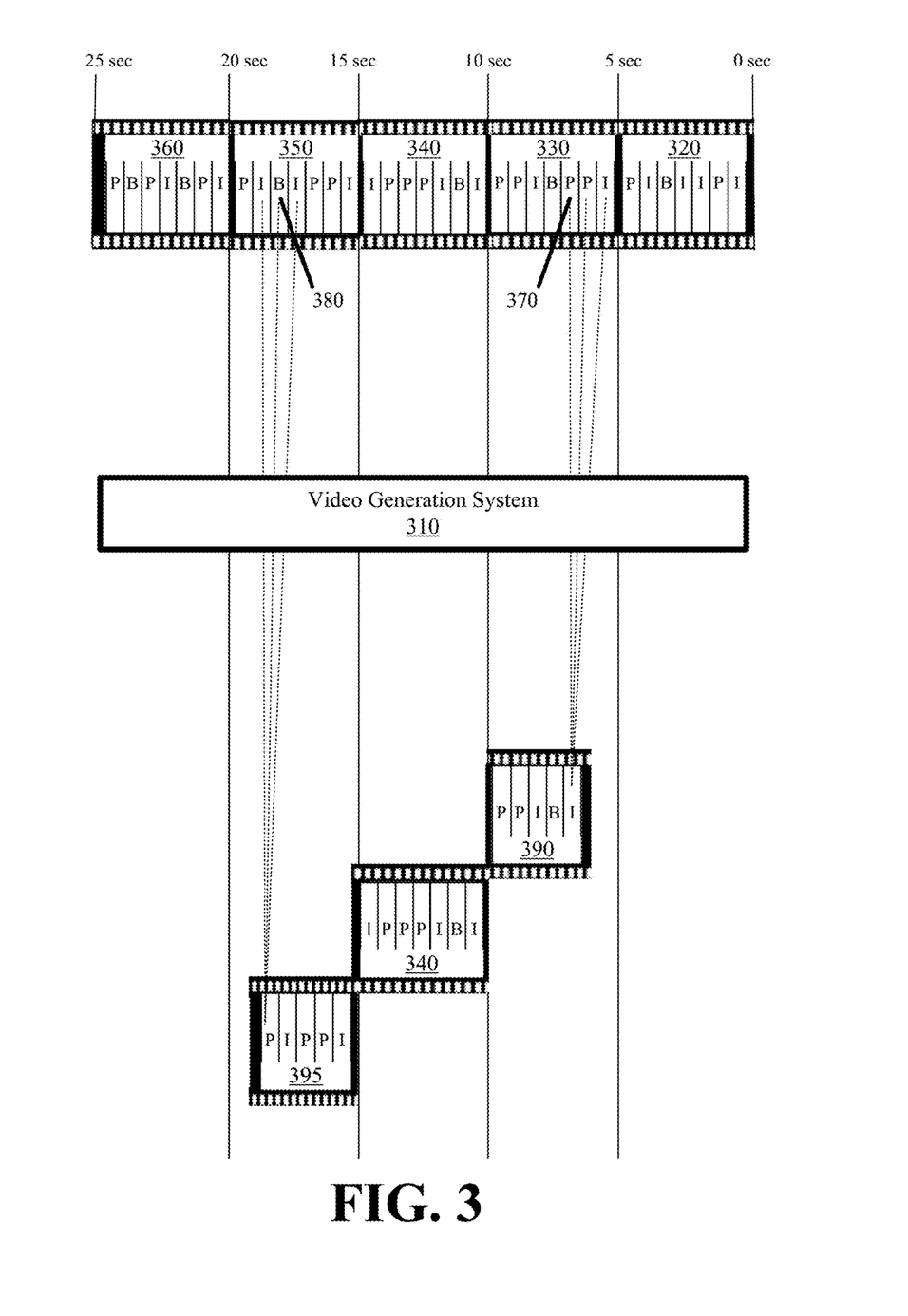
FIG. 3 conceptually illustrates the snippet creation in accordance with some embodiments.

FIG. 3 conceptually illustrates the snippet creation in accordance with some embodiments. The figure illustrates five encoded slices 320, 330, 340, 350, and 360 of an original video asset from which the video generation system 310 clips to create a snippet with a re-encoded start slice 390, a re-encoded end slice 395, and an original encoded slice 340. It should be noted that the entire original video asset may involve many more slices than those depicted in FIG. 3 and the five encoded slices are presented for illustrative purposes. In this figure, each slice 320, 330, 340, 350, and 360 represents a different five seconds of the original video asset. The frame types that form each slice 320, 330, 340, 350, and 360 are shown for illustrative purposes.

The video generation system 310 receives user specified start and end times for a desired snippet. The video generation system 310 identifies the snippet start time to be within the second slice 330 and the snippet end time to be within the fourth slice 350. More specifically, the video generation system 310 identifies frame 370 from the second slice 330 corresponding to the snippet start time and frame 380 from the fourth slice 350 corresponding to the snippet end time.

Frame 370 is a P-frame that references a prior P-frame that references a prior I-frame of the second slice 330. The snippet start slice 390 cannot be directly created from frame 370. Accordingly, the video generation system 310 decodes the second slice 330. The video generation system 310 then re-encodes a subset of the decoded frames spanning from frame 370 to the last frame of the second slice 330. The re-encoded set of frames forms the snippet start slice 390. The re-encoding converts starting frame 370 to an I frame with subsequent frames of the snippet start slice 390 comprising a combination of I, P, B, and other frame types.

Frame 380 is a B-frame that references a forward I-frame and a previous I-frame. The snippet end slice 395 cannot be directly created from frame 380. Here again, the video generation system 310 decodes the fourth slice 350 in order to then re-encode a subset of decoded frames spanning from the first frame of the fourth slice 350 to frame 380. The re-encoded set of frames forms the snippet end slice 395. The re-encoding clips the fourth slice 350 such that the snippet end slices 395 stops at the frame 380 corresponding to the snippet end time.

In FIG. 3, the video generation system generates the snippet from the snippet start slice 390, the third slice 340 of the original video asset encoding, and the snippet last slice 395. As noted above, snippet generation may further include creating a manifest that identifies the snippet slices for playback. In this case, the manifest identifies the snippet as starting with the snippet start slice. The manifest identifies the clipped duration of the snippet start slice. The manifest then identifies the subsequent ordering of the remaining snippet slices as well as their respective durations. The manifest is provided to a client player requesting the snippet. Upon receiving the manifest, the client player is then able to request the snippet slices in the correct order for playback.

In some embodiments, the video generation system creates a snippet at multiple bit rates. In some such embodiments, the video generation system encodes the original video asset at each of the different bit rates. The video generation system then creates the snippet by re-encoding the snippet first slice and the snippet last slice at each of the bit rates. The different bit rate encoded snippet first slices and last slices are then matched with the corresponding bit rate encoded slices of the original video asset falling in between the snippet first slice and snippet last slice.

Figure 4:
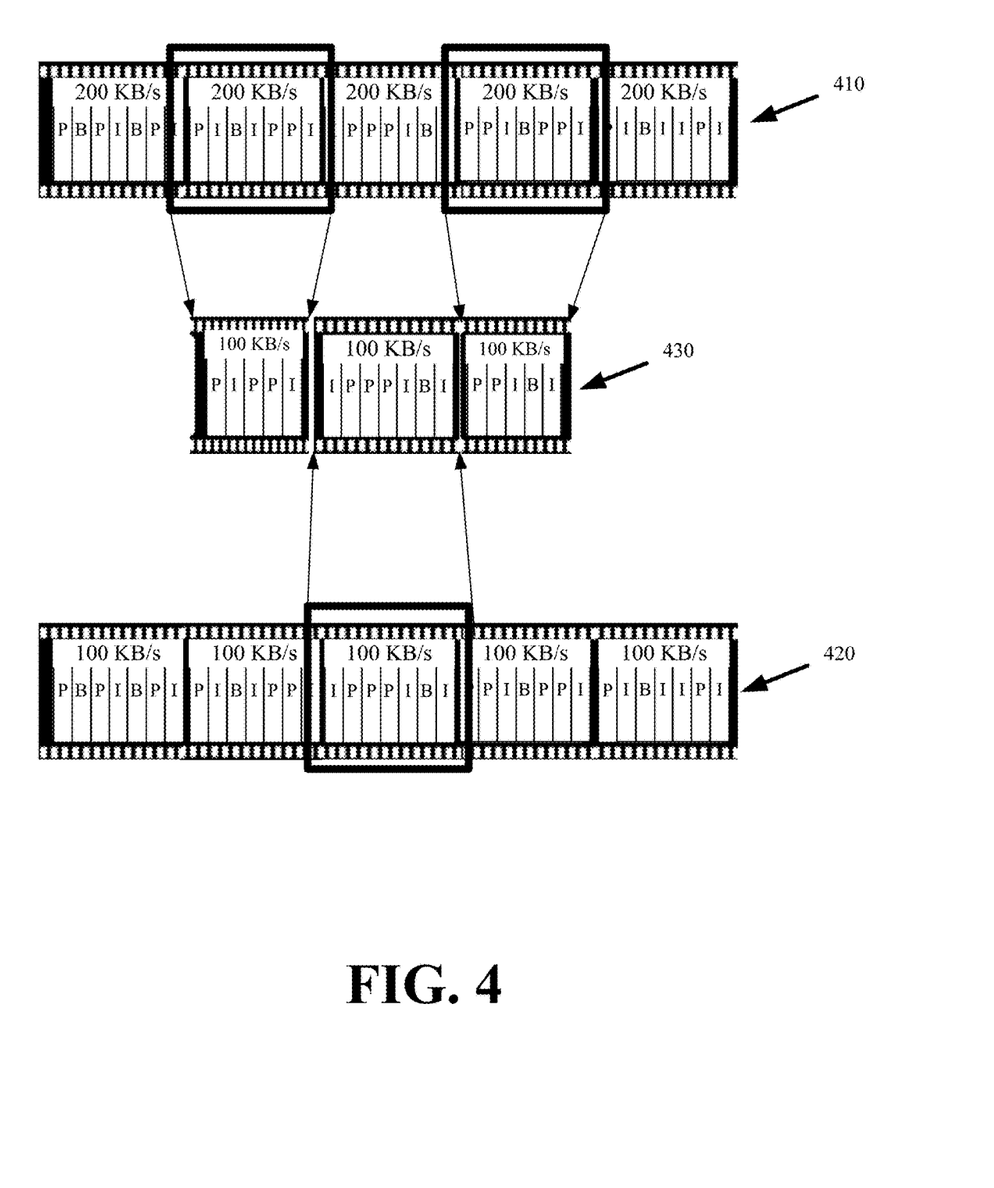
FIG. 4 conceptually illustrates creating a snippet at a particular bit rate from an original video asset that is encoded at different bit rates.

FIG. 4 conceptually illustrates creating a snippet at a particular bit rate from an original video asset that is encoded at different bit rates. The original video asset encoding produces at least a first set of slices 410 that encode the original video asset at a high or higher quality first bit rate and a second set of slices 420 that encode the original video asset at a low or lower quality second bit rate.

To create a snippet 430 at the low quality second bit rate, the video generation system identifies a first slice spanning the snippet start time and a second slice spanning the snippet end. Since re-encoding the snippet start slice and end slice is a lossy process and in order to minimize quality loss, the video generation system obtains the first and second slices from the first set of slices 410 encoded at the high quality first bit rate rather than the low quality second bit rate at which the snippet 430 is generated. The video generation system clips the first and second slices from the first set of slices 410 and re-encodes them at the low quality second bit rate to produce the snippet start and end slices. The video generation system then generates the snippet 430 from the snippet start slice, a subset of slices from the second set of slices 420 (i.e., low quality second bit rate) between the first and second slices, and the snippet end slice.

Figure 5:
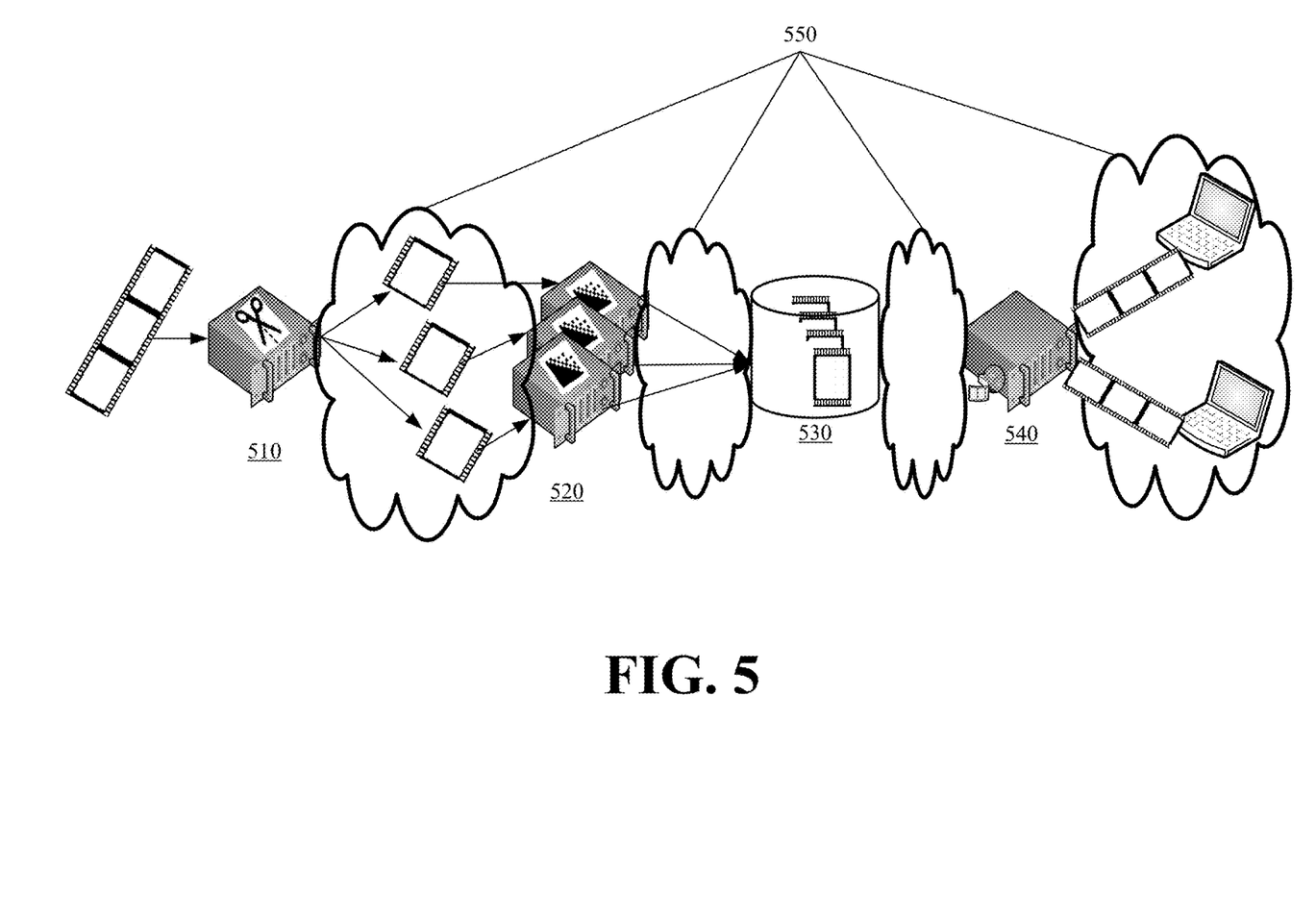
FIG. 5 is a block diagram of an exemplary video generation system for encoding video content into a sequence of slices and for efficiently creating snippets from encoded slices.

FIG. 5 is a block diagram of an exemplary video generation system for encoding video content into a sequence of slices and for efficiently creating snippets from encoded slices. The system involves at least one slicer 510, encoder 520, storage 530, and server 540, each communicably coupled via a data communications network 550 (e.g., public network such as the Internet or private network such as a local area network (LAN)).

A video creator feeds video content to the slicer 510. The slicer 510 partitions the video content into a plurality of slices. The slicer 510 may be a lightweight piece of software that runs on the computing system near the signal source (e.g., source file or live feed), such as a laptop computer of the video creator. The slicer 510 can also run on a remote machine to which the video content is uploaded.

The plurality of slices pass from the slicer 510 to the one or more encoders 520. The encoders 520 collectively work to produce the encoded slices. For example, a different encoder 520 may retrieve a slice, encode the slice, and store the encoded slice to storage 530. The encoders 520 also produce the snippets according to the above described embodiments.

Multiple encoders 520 may be used to encode a video asset at different bit rates or quality settings. The encoders 520 can similarly generate snippets of a video asset at each of the different video asset encoded bit rates. Alternatively, the encoders 520 can generate a snippet at a particular bit rate. To minimize quality loss, the encoders 520 may generate the snippet start and end slices at the particular bit rate from the highest quality encoded slices of the video asset, while reusing the video asset slices that were encoded at the particular bit rate for filling the duration in between the snippet start and end slices.

In some embodiments, the server 540 receives requests for encoded video content over the network 550 from media players executing on the client computing systems (referred to herein as the "client"). The server 540 passes the encoded slices of the original video content from the storage 530 in response to such requests. The client and the server 540, which may be executed on a server of a content delivery network, may be coupled by the network 550. The network 550 may include any digital public or private network. The client may be a client workstation, a server, a computer, a portable electronic device, an entertainment system configured to communicate over a network, such as a set-top box, a digital receiver, a digital television, a mobile phone, or other electronic devices. For example, portable electronic devices may include, but are not limited to, cellular phones, portable gaming systems, portable computing devices, or the like. The server 540 may be a network appliance, a gateway, a personal computer, a desktop computer, a workstation, etc.

In some embodiments, video creators use an application or application programming interface (API) to submit snippet requests to the video generation system. The snippet requests can be passed to the server 540 or directly to the one or more encoders 520 for execution and snippet generation. The snippet request identifies the video asset from which the snippet is to be generated as well as start and end times for the snippet. The snippet request may specify additional information including a bit rate or other quality settings for the snippet. Once an encoder 520 receives a snippet request, the encoder 520 obtains the encoded slices of the video asset. The encoder 520 decodes and re-encodes the slices from which the snippet start and end slices are produced and stores the snippet start and end slices along with a manifest for the snippet back to the storage 550 for subsequent distribution by the server 540.

Although shown in FIG. 5 as a distributed system of slicers, encoders, and servers, the video generation system of some embodiments is a standalone machine that produces the snippets. In some such embodiments, the video generation system produces the original video asset encoded slices or has access to those slices, whether the encoded slices are stored on local or remote storage. In other words, any device can be used to efficiently clip video as described above as long as the device has access to the encoded video slices that form the original video asset.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 6:
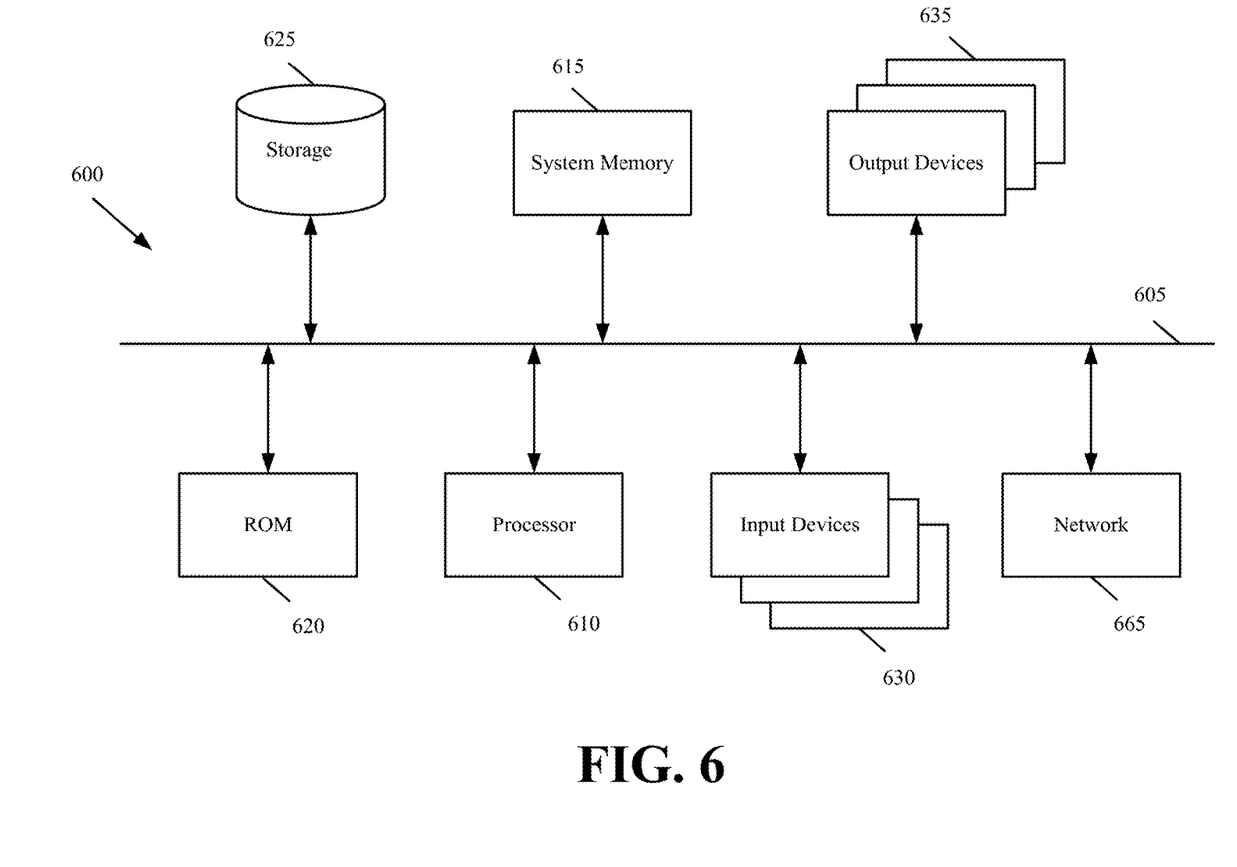
FIG. 6 illustrates a computer system or server with which some embodiments are implemented.

FIG. 6 illustrates a computer system or server with which some embodiments are implemented. Such a computer system includes various types of computer-readable mediums and interfaces for various other types of computer-readable mediums that implement the various methods and machines described above (e.g., video generation system). Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the invention. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments use a mass-storage device (such as a magnetic, solid-state, or optical disk) as the permanent storage device 625.

Other embodiments use a removable storage device (such as a flash drive) as the permanent storage device like the permanent storage device 625, the system memory 615 is a read-and-write memory device. However, unlike storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include alphanumeric keypads (including physical keyboards and touchscreen keyboards), pointing devices. The input devices 630 also include audio input devices (e.g., microphones, MIDI musical instruments, etc.). The output devices 635 display images generated by the computer system. The output devices include printers and display devices, such as cathode ray tubes (CRT) or liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 600 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+ RW, etc.), flash memory (e.g., SD cards, mini-SD cards, micro-SD cards, etc.), magnetic and/or solid state hard drives, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
encoding a video asset as a plurality of slices, wherein each slice of the plurality of slices encodes a different duration of the video asset;
receiving a request for generating a snippet from the video asset, said request comprising a start time and an end time for said snippet, wherein a duration between the start time and the end time is less than a total duration of the video asset;
identifying a first slice of the plurality of slices encoding a duration of the video asset spanning the start time, and a second slice of the plurality of slices encoding a duration of the video asset spanning the end time;
producing a snippet start slice by clipping at least a first frame from the first slice and re-encoding the first slice from a subsequent frame aligned with the start time that is after the first frame of the first slice;
producing a snippet end slice by clipping at least a last frame from the second slice and re-encoding the second slice to a preceding frame aligned with the end time that is before the last frame of the second slice; and
generating the snippet from the snippet start slice, a subset of the plurality of slices between the first slice and the second slice, and the snippet end slice.

2. The method of claim 1, wherein re-encoding the first slice comprises converting the subsequent frame aligned with the start time to a key frame.

3. The method of claim 2, wherein converting the subsequent frame to the key frame comprises encoding the key frame using information from at least the first frame and the subsequent frame aligned with the start time.

4. The method of claim 1 further comprising decoding a plurality of frames from each of the first slice and the second slice.

5. The method of claim 4, wherein said decoding comprises converting the subsequent frame aligned with the start time to a key frame based on information from the subsequent frame and at least one adjacent frame.

6. The method of claim 1, wherein the snippet start slice is shorter in duration than the first slice, the snippet end slice is shorter in duration than the second slice, and the subset of slices are unmodified from corresponding slices of the video asset.

7. The method of claim 1 further comprising sending the snippet start slice over a network to a client in response to a request for the snippet from the client.

8. The method of claim 1 further comprising generating a snippet manifest, the snippet manifest listing playback order of the snippet start slice, the subset of slices, and the snippet end slice.

9. The method of claim 8 further comprising sending the snippet manifest in response to a request for said snippet.

10. A method comprising
encoding a media asset as a plurality of slices, wherein each slice of the plurality of slices encodes a different duration of the media asset;
receiving a snippet start time and end time;
obtaining a first slice from the plurality of slices with a start duration and end duration spanning the snippet start time;
obtaining a second slice from the plurality of slices with a start duration and end duration spanning the snippet end time;
encoding a snippet start slice from a portion of the first slice, wherein said encoding clips a set of frames from the first slice spanning the first slice start duration to the snippet start time;
encoding a snippet end slice from a portion of the second slice, wherein said encoding clips a set of frames from the second slice spanning the snippet end time to the second slice end duration; and
serving a snippet of the media asset by sending the snippet start slice, a subset of the plurality of slices between the first slice and the second slice, and the snippet end slice.

11. The method of claim 10, wherein encoding the media asset comprises encoding a first set of the plurality of slices at a high quality first bit rate and a second set of the plurality of slices at a low quality second bit rate.

12. The method of claim 11 further comprising receiving a request for said snippet at the low quality second bit rate.

13. The method of claim 12, wherein obtaining the first slice comprises obtaining the first slice from the first set of slices encoded at the high quality first bit rate, and wherein obtaining the subset of the plurality of slices comprises obtaining the subset of slices from the second set of slices encoded at the low quality second bit rate.

14. The method of claim 13, wherein serving the snippet comprises sending the snippet start slice encoded from a slice of the first set of slices, a subset of the second set of slices, and the snippet end slice encoded from a slice of the first set of slices.

15. The method of claim 10 further comprising partitioning the media asset into the plurality of slices prior to said encoding of the media asset.

16. The method of claim 10 further comprising serving the media asset by sending the plurality of slices.

17. A method comprising:
obtaining a first media chunk encoding a first portion of a media asset and a second media chunk encoding a second subsequent portion of the media asset;
decoding a plurality of frames from the first media chunk;
identifying a particular frame from the plurality of frames aligned with a snippet start time;
converting the particular frame to a key frame based on information of the particular frame and at least one frame immediately preceding or following the particular frame in the plurality of frames;
encoding a snippet start chunk from the particular frame, wherein said encoding encodes the key frame, based on the particular frame, and all frames in between the particular frame and a last frame of the plurality of frames;
producing a media asset snippet from the snippet start chunk and at least the second media chunk without modifying the second media chunk.

18. The method of claim 17 further comprising distributing the same second media chunk as part of distributing the media asset to a first user and as part of distributing the media asset snippet to a second user.

19. The method of claim 17, wherein the particular frame is a P frame or a B frame, and wherein converting the particular frame to a key frame comprises converting the particular frame to an I frame.

20. The method of claim 17, wherein encoding the snippet start chunk comprises discarding the at least one frame immediately preceding the particular frame in the plurality of frames from the snippet start chunk.

* * * * *